United States Patent
Mofakhami et al.

(10) Patent No.: US 10,764,987 B2
(45) Date of Patent: Sep. 1, 2020

(54) METHOD FOR GENERATING NEUTRONS

(75) Inventors: Arash Mofakhami, Buthiers (FR);
Tarek Nassar, Espoo (FI)

(73) Assignee: NEUSCA SAS, Buthiers (FR)

( * ) Notice: Subject to any disclaimer, the term of this patent is extended or adjusted under 35 U.S.C. 154(b) by 1226 days.

(21) Appl. No.: 13/512,065

(22) PCT Filed: Nov. 25, 2010

(86) PCT No.: PCT/IB2010/055431
§ 371 (c)(1),
(2), (4) Date: Oct. 22, 2012

(87) PCT Pub. No.: WO2011/064739
PCT Pub. Date: Jun. 3, 2011

(65) Prior Publication Data
US 2013/0148770 A1    Jun. 13, 2013

(30) Foreign Application Priority Data

Nov. 25, 2009 (FR) ........................... 95 8353
Nov. 25, 2009 (FR) ........................... 95 8354

(51) Int. Cl.
*G21B 1/19* (2006.01)
*H05H 3/06* (2006.01)

(52) U.S. Cl.
CPC ............. *H05H 3/06* (2013.01); *G21B 1/19* (2013.01); *Y02E 30/16* (2013.01)

(58) Field of Classification Search
CPC ................................. H05H 3/06; G21B 1/19
USPC ........................................................... 376/107
See application file for complete search history.

(56) References Cited

U.S. PATENT DOCUMENTS

| | | | |
|---|---|---|---|
| 3,942,019 | A | 3/1976 | Claridge et al. |
| 4,390,494 | A | 6/1983 | Salisbury |
| 7,232,985 | B2 | 6/2007 | Monkhorst et al. |
| 2003/0016774 | A1 | 1/2003 | Santilli |

FOREIGN PATENT DOCUMENTS

| | | |
|---|---|---|
| EP | 0338619 | 10/1989 |
| GB | 795596 A | 5/1958 |
| WO | 90/13129 A2 | 11/1990 |
| WO | 9905683 | 2/1999 |
| WO | 03/019219 A1 | 3/2003 |
| WO | 2009/052330 | 4/2009 |

OTHER PUBLICATIONS

"Physics with polarized proton and electron collisions at HERA," F.Kunne, Nuc. Phys. A622 (1997) 110c-123c.*

(Continued)

*Primary Examiner* — Jack W Keith
*Assistant Examiner* — Daniel Wasil
(74) *Attorney, Agent, or Firm* — Pearne & Gordon LLP

(57) ABSTRACT

The present invention relates, in particular, to a method for generating neutrons comprising at least the series of steps that consists of: a) placing at least one beam of electrons and at least one beam of nuclei selected from among protons, deuterons and tritons into a predefined spin state and/or an interference state; and b) causing said at least one beam of nuclei and said at least one beam of electrons to collide.

10 Claims, 7 Drawing Sheets

(56) References Cited

OTHER PUBLICATIONS

Krane, Introductory Nuclear Physics, Ch. 9.*
"Unit 1: Particle Physics—Interactions and Conservation", Parrs Wood Science—Key Stage 5—Physics. 2008, pp. 1-7, XP002592004, Retrieved from the Internet: URL:http://www.parrswood.net/faculties/science/particlephysics_fundamental_forces_in teractions. html [retrieved on Jul. 14, 2010] p. 5, last paragraph-p. 6, Para.1.
Kunne, F., "Physics with Polarized Proton and Electron Collisions at HERA", Nuclear Physics A, vol. A622, No. 1-2, Aug. 25, 1997, pp. 110-123, XP002592005, Netherlands, ISSN: 0375-9474. Abstract; p. 111, Para. 1.
Mulder, F.M. et al: "Observation of Polarized Neutron Interference in Spin Space", Europhysics Letters: A Letters Journal Exploring the Frontiers of Physics, Institute of Physics Publishing, Briston, France. vol. 51, No. 1, Jul. 1, 2000, pp. 13-19, XP002591788, ISSN: 0295-5075. Abstract; p. 13, Para. 1; p. 14, last paragraph; p. 15, last paragraph; p. 19, last paragraph.
Ptitsyn, V. et al., "eRHIC—Future Machine for Experiments on Electron-Ion Collisions", Proceedings of EPAC 2006, Edinburgh, Scotland. Jul. 2006, pp. 676-678, XP002592007, Retrieved from the Internet: URL: http://accelconf.web.cern.ch/Accel Conf/e06/PAPERS? MOPLS058.pdf [retrieved on Jul. 14, 2010], p. 676, Paragraph 1-Paragraph 2.
International Search Report for PCT/IB2010/055431 dated Apr. 29, 2011.
Kulsrud, Russell M, et al., United States Statutory Invention Registration, Registration No. H446, Published Mar. 1, 1988.
Mao, Xiaotian, et al., Giant Dipole Resonance Neutron Yields Produced by Electrons as a Function of Target Material and Thickness, Stanford Linear Accelerator Center, Stanford University, Jan. 1996.
Hubert, G. "Experimental validation of the neutron production by electron capture on proton." ONERA French Aerospace Lab. Space Environment Department. Jan. 2016.
Kim. "Neutron Burst From a High-Voltage Discharge Between Palladium Electrodes in D2(sub) Gas." Fusion Technology, vol. 18, p. 680-681, Dec. 1990.*
Yamada, et al. "Neutron Emission from Palladium Point Electrode in Pressurized Deuterium Gas under DC Voltage Application." Int. J. of the Soc. of Mat. Eng. for Resources. vol. 6, No. 1. 14-21 (1998). http://www.readcube.com/articles/10.5188%2Fijsmer.6.14.
Ruggero Maria Santilli. Apparent Nuclear Transmutations without Neutron Emission Triggered by Pseudoprotons. American Journal of Modern Physics. vol. 4, No. 1, (2015), pp. 15-18. doi: 10.11648/j.ajmp.20150401.13.
Santilli, et al. "Confirmation of the laboratory synthesis of neutrons from a hydrogen gas." Journal of Computational Methods in Sciences and Engineering. 14 (2014) 405-414.
"Electron capture." Wikipedia. Last accessed Nov. 22, 2016. https://en.wikipedia.org/wiki/Electron_capture.

* cited by examiner

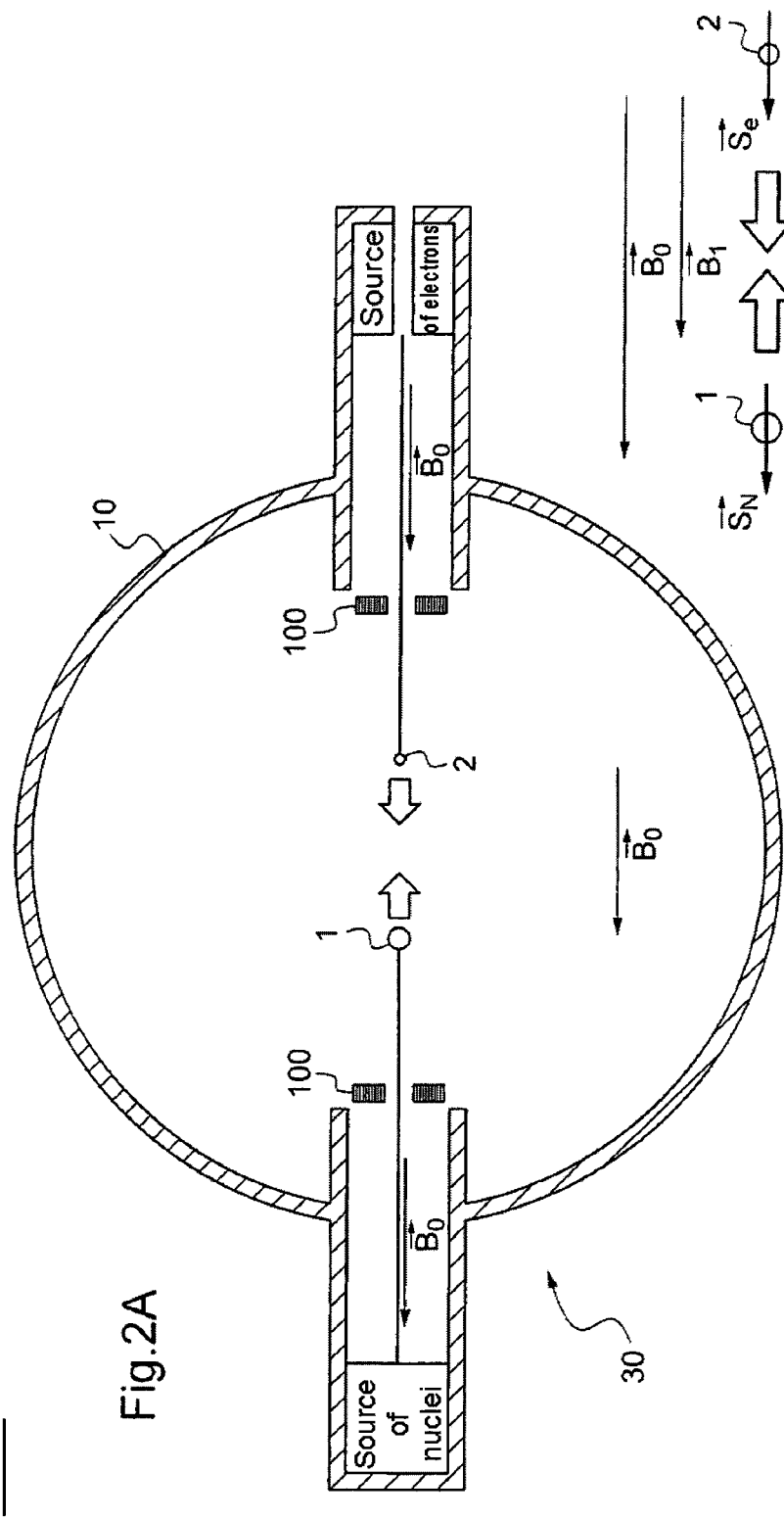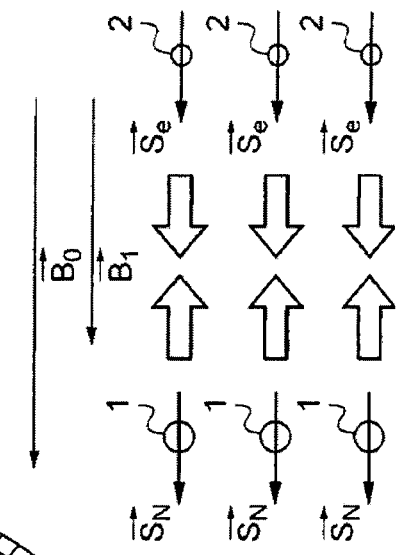

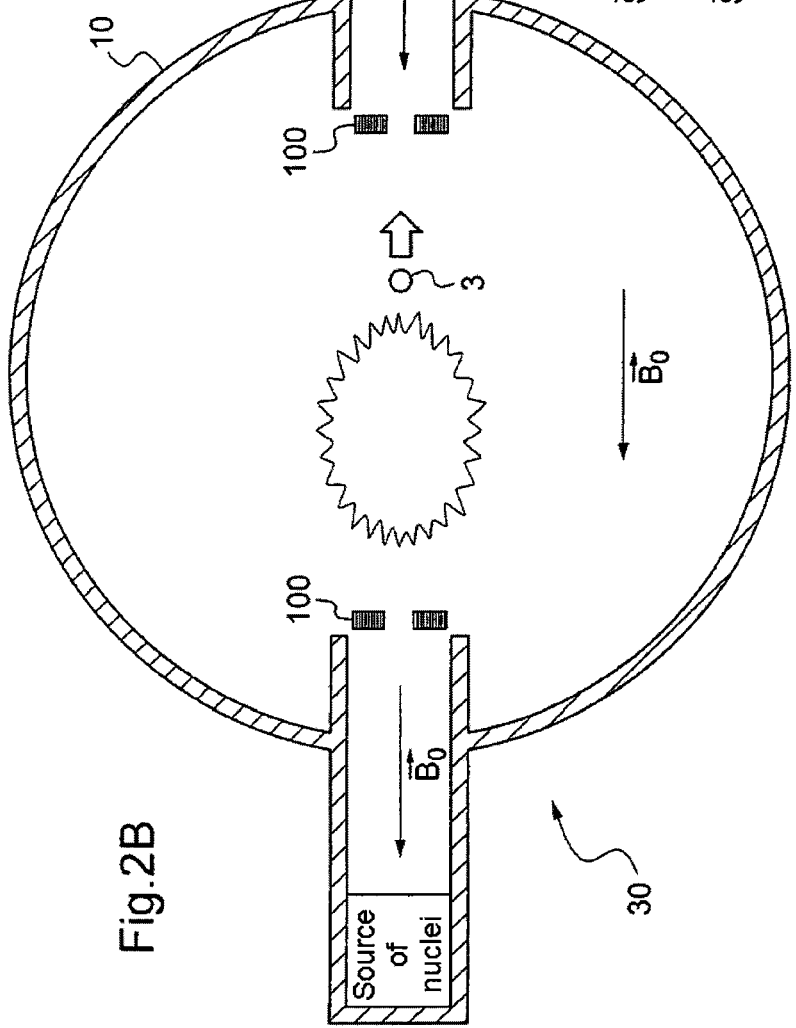
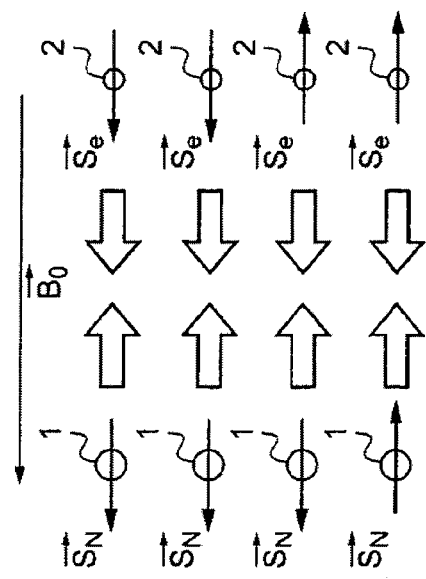

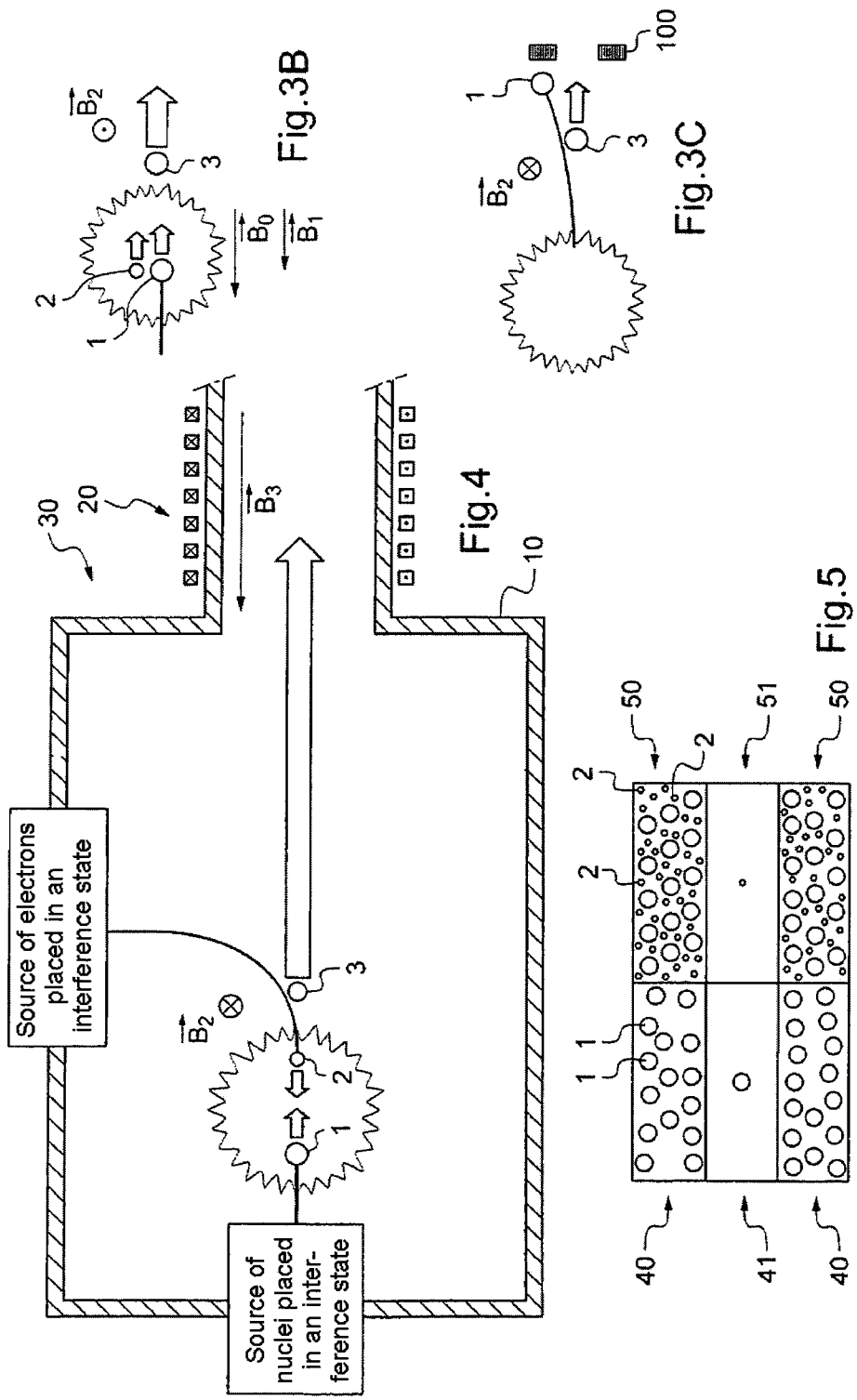

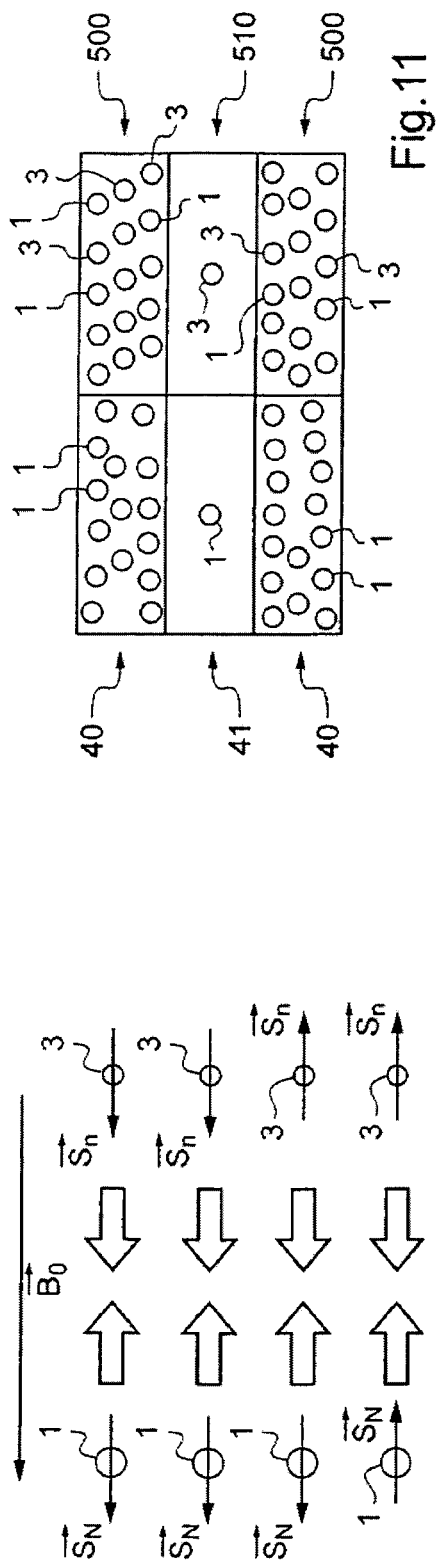
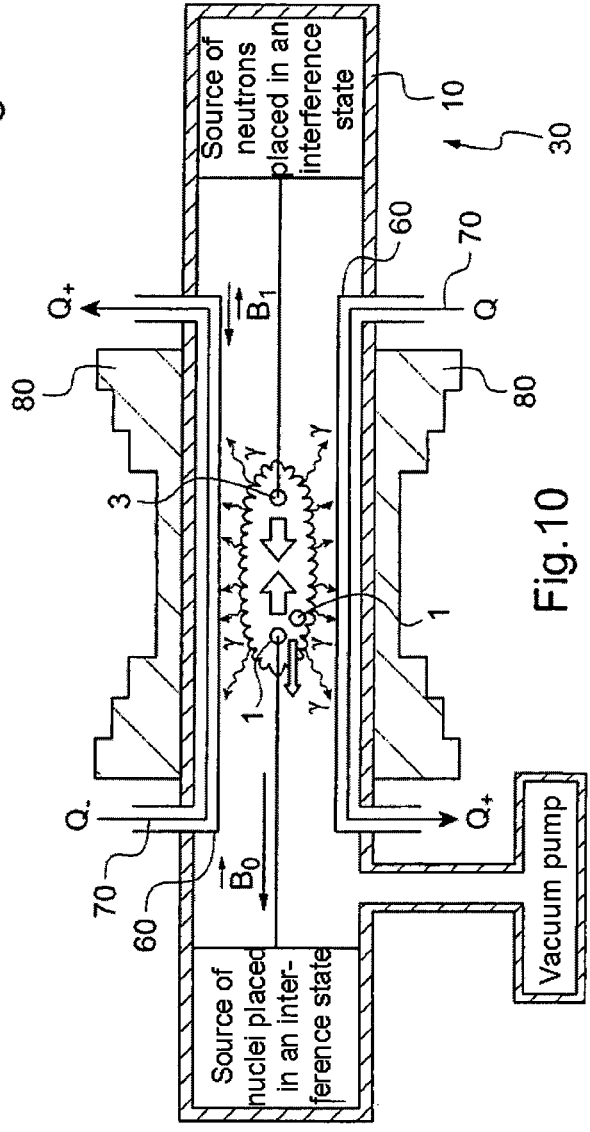
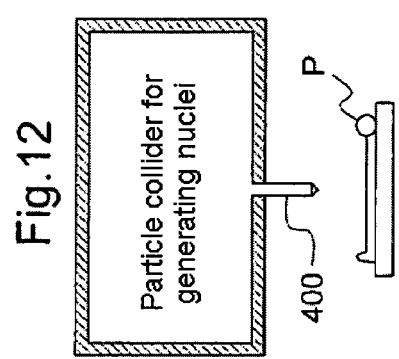
Fig. 11
Fig. 10
Fig. 9A
Fig. 12

METHOD FOR GENERATING NEUTRONS

The present invention relates in particular to the methods and sources for generating neutrons.

The present invention also relates to nuclear fusion and/or fission methods and to particle colliders for generating nuclei.

BACKGROUND

The international application WO 2009/052330 describes a method for generating neutrons comprising a step of collision of a beam of ions and a target. The target comprises atoms having the same spin state as the ions.

The international application WO 99/05683 describes a method of electronic capture by protons in order to form neutrons.

It is known practice to generate neutrons as described in EP0338619 or in the publication "Giant Dipole Resonance Neutron Yields Produced By Electrons As A Function Of Target Material And Thickness" by Mao et al., Stanford Linear Accelerator Center, Stanford University. However, such methods may have a relatively high neutron generation energy cost.

The U.S. Pat. No. 4,390,494 describes a nuclear fusion method comprising a step of collision between two beams of ions having their spins aligned.

The document H446 describes a method for controlling the fusion reactions.

The U.S. Pat. No. 7,232,985 describes a controlled fusion method.

A first objective of the present invention is to propose novel neutron generation methods.

A second objective of the present invention is to propose novel particle colliders for generating neutrons.

A third objective of the present invention is to have methods and devices for generating neutrons that have a neutron generation energy cost lower than those of the methods and devices known from the prior art.

A fourth objective of the present invention is to propose novel methods for generating nuclei by nuclear fusion or fission.

A fifth objective of the present invention is to propose novel particle colliders for generating nuclei.

SUMMARY

Generation and Uses of Neutrons

According to a first aspect, the invention relates to a method for generating neutrons, for example a beam of neutrons, comprising at least the successive steps consisting in:

a) placing at least one beam of nuclei chosen from protons (hydrogen nuclei), deuterons (deuterium nuclei) and tritons (tritium nuclei) and at least one beam of electrons in a defined spin state and/or in an interference state, and b) causing said at least one beam of nuclei and at least one beam of electrons to collide.

The term "beam" should be understood to mean a set of particles, driven with a velocity, produced by a source in one or more given spatial directions.

The expression "placing a beam in a defined spin state" should be understood to mean that the means implemented for placing in a defined spin state enable, for example, at least 50%, for example at least 75%, for example substantially all of the particles forming said beam to have a determined spin state.

The spins of the electrons and of the nuclei can, in the collision step, be aligned in the same direction.

The spins of the electrons, respectively of the nuclei, and the velocity vectors of the electrons, respectively of the nuclei, may be colinear in the collision step.

The expression "colinear spin and velocity vector" should be understood to mean that the spin and the velocity vector of said particle can be in the same direction or in opposite directions.

In particular, the spins of the electrons, respectively of the nuclei, and the velocity vectors of the electrons, respectively of the nuclei, may be colinear and have the same direction in the collision step. In other words, the spins of given particles form with the velocity vectors of these same particles an oriented angle of between −10 and 10°.

The beams of nuclei and of electrons may, in the collision step, have a substantially opposite direction of displacement. In other words, the velocity vectors of the nuclei and of the electrons, caused to collide, may form, in the collision step, an oriented angle of between 170 and 190°.

As a variant, the beams of nuclei and of electrons may have, in the collision step, a substantially identical direction of displacement. In other words, the velocity vectors of the nuclei and of the electrons, caused to collide, may form, in the collision step, an oriented angle of between −10 and 10°.

The method according to the invention may have a neutron generation yield greater than 10%, for example than 25%.

The "neutron generation yield" is defined as: [number of neutrons generated by the collision of the beams of nuclei and of electrons]/[0.5*(number of protons in the beam of nuclei+number of electrons in the beam of electrons)+(number of neutrons in the beam of nuclei)].

According to another of its aspects, the invention relates to a particle collider for generating neutrons, for example for implementing a method as described above, comprising:
  a chamber,
  a source of nuclei configured to generate at least one beam of nuclei chosen from protons, deuterons and tritons,
  a source of electrons configured to generate at least one beam of electrons, and
    a means making it possible to generate one or more magnetic fields configured to place said at least one beam of nuclei and at least one beam of electrons in a defined spin state before the collision, and/or
    a means making it possible to obtain particle interferences configured to place said at least one beam of nuclei and at least one beam of electrons in an interference state before the collision.

The term "particle collider" should be understood to mean a device making it possible to obtain at least one collision between two beams of particles.

According to yet another of its aspects, the invention relates to a medical installation, for example for destroying human or animal cancerous cells, comprising at least:
  a means for positioning a patient to be treated,
  a particle collider, for example as defined above, comprising at least:
    a chamber,
    a source of nuclei configured to generate at least one beam of nuclei,
    a source of electrons configured to generate at least one beam of electrons, and a means making it possible to generate one or more magnetic fields configured to place the spins of the nuclei and of the electrons in a defined state, and/or a means making it possible to obtain particle interferences configured to place said at least one beam of nuclei and of electrons in an interference state.

The neutrons generated according to the invention may thus, for example, be used for hadrontherapy.

According to yet another of its aspects, the invention relates to the use of the neutrons generated by the methods and/or the particle colliders as described above for nuclear fusion or, more generally, for obtaining nuclei in experimental physics, for producing radioisotopes and for transmutation.

Generation and Uses of Nuclei

According to another aspect, the invention relates to a method for generating nuclei, for example a beam of nuclei, comprising at least the successive steps consisting in:

a) placing at least:
  one beam of neutrons and at least one beam of nuclei in a defined spin state and/or in an interference state, or
  one beam of neutrons and at least one beam of atomic particles in a defined spin state, or
  one first beam of nuclei and at least one second beam of nuclei in an interference state, and
b) causing said beams to collide.

The expression "atomic particle" should be understood to mean an ion or an atom.

The expression "placing a beam of atomic particles in a defined spin state" should be understood to mean that the nuclei of said atomic particles are placed in a defined spin state. In other words, unless stipulated otherwise, the characteristics concerning the spin of an atomic particle are relative to the spin of the nucleus of said atomic particle.

The spins of the neutrons and of the nuclei may, in the collision step, be aligned in the same direction.

In another exemplary embodiment, the spins of the neutrons and of the atomic particles may, in the collision step, be aligned in the same direction.

The spins of the neutrons, respectively of the nuclei, and the velocity vectors of the neutrons, respectively of the nuclei, may be colinear in the collision step.

The spins of the neutrons, respectively of the atomic particles, and the velocity vectors of the neutrons, respectively of the atomic particles, may be colinear in the collision step.

In particular, the spins of the neutrons, respectively of the nuclei, and the velocity vectors of the neutrons, respectively of the nuclei, may be colinear and have the same direction in the collision step.

In another exemplary embodiment, the spins of the neutrons, respectively of the atomic particles, and the velocity vectors of the neutrons, respectively of the atomic particles, may be colinear and have the same direction in the collision step.

The:
beams of neutrons and of nuclei, or
beams of neutrons and of atomic particles, or
first and second beams of nuclei may, in the collision step, have a substantially opposite direction of displacement.

In other words, the velocity vectors:
of the neutrons and of the nuclei, or
of the neutrons and of the atomic particles, or
of the nuclei of the first and second beams of nuclei, caused to collide, may form, in the step b), an oriented angle of between 170 and 190°.

According to another of its aspects, the invention relates to a method for producing energy comprising at least the successive steps consisting in:

a) placing at least:
  one beam of neutrons and at least one beam of nuclei in a defined spin state and/or in an interference state, or
  one beam of neutrons and at least one beam of atomic particles in a defined spin state, or
  one first beam of nuclei and at least one second beam of nuclei in an interference state, and
b) causing said beams to collide, and
c) recovering the energy produced by the collision occurring in the step b).

According to another of its aspects, the invention relates to a method for generating particles comprising at least the steps consisting in:

placing at least one first and one second beams of neutrons in a defined spin state and/or in an interference state, and
causing said first and second beams of neutrons to collide.

According to another of its aspects, the invention relates to a particle collider for generating nuclei, for example for implementing methods as described above, comprising:

a chamber,
a source:
  of nuclei configured to generate at least one beam of nuclei, or
  of atomic particles configured to generate at least one beam of atomic particles,
a source of neutrons configured to generate at least one beam of neutrons, and
a means making it possible to generate one or more magnetic fields configured to place the spins of the nuclei and of the neutrons or the spins of the atomic particles and of the neutrons in a defined state before the collision, and/or
a means making it possible to obtain particle interferences configured to place said at least one beam of nuclei and of neutrons in an interference state before the collision.

According to another of its aspects, the invention relates to a particle collider for generating nuclei, for example for implementing methods as described above, comprising:

a chamber,
a first source of nuclei configured to generate at least one first beam of nuclei,
a second source of nuclei configured to generate at least one second beam of nuclei, and
a means making it possible to obtain particle interferences configured to place said first and second beams of nuclei in an interference state before the collision.

According to another of its aspects, the invention relates to a particle collider for generating particles, for example for implementing the method for generating particles described above, comprising:

a chamber,
a first source of neutrons configured to generate at least one first beam of neutrons,
a second source of neutrons configured to generate at least one second beam of neutrons, and
a means making it possible to generate one or more magnetic fields configured to place said first and second beams of neutrons in a defined spin state, and/or a means making it possible to obtain particle interferences configured to place said first and second beams of neutrons in an interference state.

According to yet another of its aspects, the invention relates to a medical installation, for example for destroying human or animal cancerous cells, comprising at least:
a means for positioning a patient to be treated,
a particle collider, for example as defined above, comprising at least:
   a source:
      a. of nuclei configured to generate at least one beam of nuclei, or
      b. of atomic particles configured to generate at least one beam of atomic particles,
   a source of neutrons configured to generate at least one beam of neutrons, and
      a. a means making it possible to generate one or more magnetic fields configured to place the spins of the nuclei and of the neutrons or the spins of the atomic particles and of the neutrons in a defined state before the collision, and/or
      b. a means making it possible to obtain particle interferences configured to place said at least one beam of nuclei and of neutrons in an interference state before the collision.

According to yet another of its aspects, the invention relates to a medical installation, for example for destroying human or animal cancerous cells, comprising at least:
a means for positioning a patient to be treated,
a particle collider, for example as defined above, comprising at least:
   one first source of nuclei configured to generate at least one first beam of nuclei,
   one second source of nuclei configured to generate at least one second beam of nuclei, and
   one means making it possible to obtain particle interferences configured to place said first and second beams of nuclei in an interference state before the collision.

The nuclei generated according to the invention may thus, for example, be used for hadrontherapy.

According to yet another of its aspects, the invention relates to the use of the nuclei generated by the methods and/or particle colliders as described above for experimental physics, the production of radioisotopes, propulsion and transmutation.

The means making it possible to generate one or more magnetic fields implemented in the particle colliders according to the invention may be chosen from superconductive coils, resistive coils or "hybrid" coils comprising a resistive coil and a superconductive coil. It is also possible to use resonant circuits, for example of RLC type, comprising at least one resonance coil.

The means making it possible to obtain particle interferences implemented in the particle colliders according to the invention may comprise interferometric devices, for example as detailed below, comprising, for example, one or more diffraction gratings. It is also, for example, possible to use one or more magnetic fields in order to obtain particles placed in an interference state.

In the context of neutron production, the values for a parameter, for example relating to the beams of electrons and of nuclei, can be chosen according to the values of the other parameters.

In the context of nucleus production, the values for a parameter, for example relating to the beams of nuclei, of atomic particles and of neutrons, may be chosen according to the values of the other parameters.

Beam of Nuclei

Nature of Sources of Nuclei

The methods according to the invention may include, before the step a), a step of generating the beam of nuclei.

A source of nuclei that can be used in the context of the present invention and which can be cited is the source taught in the publication "Ion Gun Injection In Support Of Fusion Ship II Research And Development" by MILEY et al.

The sources of nuclei may include within them any type of accelerators of nuclei that can be used, such as rectilinear or linear accelerators, circular accelerators like cyclotrons or synchrotrons.

Characteristics of the Beam of Nuclei

The beam of nuclei may have, at the time of its generation, a diameter of between $10^{-8}$ and $10^{-1}$ m, for example between $10^{-6}$ and $10^{-1}$ m, for example between $5 \cdot 10^{-4}$ and $5 \cdot 10^{-3}$ m.

The expression "diameter of a beam" should be understood to mean the greatest dimension of said beam in transversal section.

The beam of nuclei may have a stream of nuclei of between $10^{14}$ and $10^{23}$ nuclei/s.

At least 50%, for example at least 75%, for example substantially all of the nuclei forming the beam of nuclei may have an energy of between 1 and $10^7$ eV, for example between 1 and $10^6$ eV, for example between 1 and $10^4$ eV.

The beam of nuclei may be emitted continuously.

As a variant, the beam of nuclei may be pulsed.

The expression "pulsed beam" should be understood to mean that the beam is emitted in the form of pulses with a duration for example less than or equal to $10^{-3}$ s, for example 1 µs, for example 1 ns, for example less than or equal to $10^{-11}$ s.

The pulses may, for example, have a duration of between $10^{-12}$ and $10^{-6}$ s.

A pulsed beam can notably make it possible to limit the disturbing interactions between the particles forming the beams and the particles generated in the collision step.

When the beam of nuclei is pulsed, the duration separating two successive pulses may, for example, be less than or equal to 1 ms, for example 1 µs, for example less than or equal to 1 ns.

When the beam of nuclei is pulsed, the number of nuclei emitted per pulse may, for example, be between $10^{12}$ and $10^{17}$ nuclei/pulse.

According to another exemplary embodiment, the methods for generating nuclei according to the invention may include, before the step a), a step for generating first and second beams of nuclei.

It is understood that the characteristics and sources described above may, for example, be applicable to said first and second beams of nuclei.

According to yet another exemplary embodiment, the methods for generating nuclei according to the invention may include, before the step a), a step for generating the beam of atomic particles.

The characteristics, described above, relating to the beam of nuclei may be applicable to the beam of atomic particles.

Furthermore, the atomic particles may, for example, be produced by any of the techniques for ionizing and creating beams of atoms known to those skilled in the art.

Beam of Neutrons

Nature of the Sources of Neutrons

The methods for generating nuclei according to the invention may include, before the step a), a step for generating the beam of neutrons.

It is possible to use, in the context of the methods for generating nuclei according to the invention, the neutrons obtained, for example in fission reactions, in nuclear power plant reactors.

It is also possible to use, in the context of the methods for generating nuclei according to the invention, the neutrons obtained by the methods for generating neutrons described above.

It is also possible to use sources of neutrons as described in the publication "Giant Dipole Resonance Neutron Yields Produced By Electrons As A Function Of Target Material And Thickness" by Mao et al., Stanford Linear Accelerator Center, Stanford University.

Characteristics of the Beams of Neutrons

The beam of neutrons may have, at the time of its generation, a diameter of between $10^{-8}$ and $10^{-1}$ m, for example between $10^{-6}$ and $10^{-1}$ m, for example between $5 \cdot 10^{-4}$ and $5 \cdot 10^{-3}$ m.

The expression "diameter of a beam" should be understood to mean the greatest dimension of said beam in transversal section.

The beam of neutrons may have a neutron stream of between $10^{14}$ and $10^{23}$ neutrons/s.

At least 50%, for example at least 75%, for example substantially all of the neutrons forming the beam of neutrons may have an energy of between 1 and $10^7$ eV, for example between 1 and $10^6$ eV, for example between 1 and $10^4$ eV.

The beam of neutrons may be emitted continuously.

As a variant, the beam of neutrons may be pulsed.

The expression "pulsed beam" should be understood to mean that the beam is emitted in the form of pulses of a duration less than or equal to for example $10^{-3}$ s, for example 1 for example 1 ns, less than or equal to for example $10^{-11}$ s.

The pulses may, for example, have a duration of between $10^{-12}$ and $10^{-6}$ s.

A pulsed beam may notably make it possible to limit the disturbing interactions between the particles forming the beams and the particles generated in the collision step.

When the beam of neutrons is pulsed, the duration separating two successive pulses may, for example, be less than or equal to 1 ms, for example 1 μs, for example 1 ns.

When the beam of neutrons is pulsed, the number of neutrons emitted per pulse may, for example, be between $10^{12}$ and $10^{17}$ neutrons/pulse.

Moreover, the beam of nuclei generated by the methods for generating nuclei according to the invention may be emitted continuously.

As a variant, when the beam of nuclei generated is emitted in the form of pulses, the methods for generating nuclei according to the invention may include a step for setting the pulse duration of said beam.

The step for setting the pulse duration of the beam of nuclei may include a step for setting the pulse duration of the beam of neutrons and/or a step for setting the pulse duration of the beam of nuclei intended to be caused to collide.

The beam of nuclei generated may be emitted in the form of pulses of a duration less than or equal to for example $10^{-3}$ s, for example 1 μs, for example 1 ns, for example less than or equal to $10^{-11}$ s.

The methods for generating nuclei according to the invention may include a step for setting the stream of nuclei generated.

The step for setting the stream of nuclei generated may include a step for setting the stream of neutrons of the beam of neutrons and/or a step for setting the stream of nuclei of the beam of nuclei intended to be caused to collide.

The beam of nuclei generated may have a stream of nuclei, for example, of between $10^{14}$ and $10^{23}$ nuclei/s.

It is therefore possible, in the context of the present invention, to have beams of nuclei for which it is possible to vary the stream and/or the duration of the pulses.

Obviously, the characteristics of the beams of nuclei generated and the setting steps described above apply mutatis mutandis to the exemplary embodiments in which the nuclei are generated by collision between a beam of neutrons and of atomic particles or between a first and a second beams of nuclei.

Beam of Electrons

Nature of the Sources of Electrons

The methods for generating neutrons according to the invention may include, before the step a), a step for generating the beam of electrons for example from a thermoionic or field-effect electron source.

Thermoionic Electron Source

The method for generating a beam of electrons from a thermoionic source includes a step for heating, for example by Joule's effect, a conductive material.

This heating step may make it possible to extract electrons which were initially linked to the conductive material.

The extracted electrons are then accelerated under an electrical field in order to generate a beam of electrons.

The conductive material may, for example, be chosen from tungsten or lanthanum hexaboride ($LaB_6$).

Field-Effect Electron Source

The method for generating a beam of electrons from a field-effect source may include a step for applying a potential difference between a metal cathode, having, for example, a pointed end, and an anode.

The shape of the end of the metal cathode may make it possible to obtain in its vicinity an electrical field of intensity greater than $10^6$ V/m, for example than $5 \cdot 10^6$ V/m. Such electrical fields may make it possible to extract electrons from the material forming the cathode.

Whatever their nature, the sources of electrons may include within them any type of electron accelerators that can be used as rectilinear or linear accelerators, circular accelerators such as, for example, cyclotrons or synchrotrons.

Characteristics of the Beam of Electrons

The diameter of the beam of electrons, at the time of its generation, may be between 1 and $10^{-1}$ m, for example between $10^{-6}$ and $10^{-1}$ m, for example between $5 \cdot 10^{-4}$ and $5 \cdot 10^{-3}$ m.

The beam of electrons may, for example, have a stream of electrons of between $10^{14}$ and $10^{23}$ electrons/s.

At least 50%, for example at least 75%, for example substantially all of the electrons forming the beam of electrons may have an energy of between 1 and $10^7$ eV, for example between 1 and $10^6$ eV, for example between 1 and $10^4$ eV.

The beam of electrons may be emitted continuously.

As a variant, the beam of electrons may be pulsed.

Thus, the beam of electrons may be emitted in the form of pulses of a duration less than or equal to for example $10^{-3}$ s, for example 1 μs, for example 1 ns, for example less than or equal to $10^{-11}$ s.

The pulses may, for example, have a duration for example of between $10^{-12}$ and $10^{-6}$ s.

When the beam of electrons is pulsed, the duration separating two successive pulses may be less than or equal to for example 1 ms, for example 1 μs, for example less than or equal to 1 ns.

When the beam of electrons is pulsed, the number of electrons emitted per pulse may for example be between $10^{12}$ and $10^{17}$ electrons/pulse.

Moreover, the beam of neutrons generated by the methods for generating neutrons according to the invention may be emitted continuously.

As a variant, when the beam of neutrons generated is emitted in the form of pulses, the methods for generating neutrons according to the invention may include a step for setting the pulse duration of said beam.

The step for setting the pulse duration of the beam of neutrons may include a step for setting the pulse duration of the beam of electrons and/or a step for setting the pulse duration of the beam of nuclei.

The beam of neutrons generated may be emitted in the form of pulses of a duration less than or equal to for example $10^{-3}$ s, for example 1 μs, for example 1 ns, for example less than or equal to $10^{-11}$ s.

The methods for generating neutrons according to the invention may include a step for setting the stream of neutrons generated.

The step for setting the stream of neutrons generated may include a step for setting the stream of electrons of the beam of electrons and/or a step for setting the stream of nuclei of the beam of nuclei.

The beam of neutrons generated may have a stream of neutrons for example of between $10^{14}$ and $10^{23}$ neutrons/s.

It is therefore possible, in the context of the present invention, to have beams of neutrons for which the stream and/or the duration of the pulses can be varied.

Interference States

The methods for generating neutrons according to the invention may include, before the collision step, a step for placing the beams of nuclei and electrons in an interference state.

The methods for generating nuclei according to the invention may include, before the collision step, a step for placing the beams of nuclei and of neutrons in an interference state.

The methods for generating nuclei according to the invention may include, before the collision step, a step for placing the first and second beams of nuclei intended to collide in an interference state.

The expression "beam placed in an interference state" should be understood to mean that the particles, which by their quantum physics nature are associated with waves, forming the beam interfere with one another thus forming, within the actual beam, at least one constructive interference region and at least one destructive interference region.

The beams of particles may be placed in a spatial interference state. In this case, the constructive interference regions correspond to regions of high probability of detection of the particles and the destructive interference regions correspond to regions of low probability of detection of the particles.

A beam of particles placed in a spatial interference state may notably be obtained by passing through at least one interferometric device.

The beams of particles may notably not be in a spinorial interference state. The means for placing the beams of particles in an interference state may notably differ from the action of an electromagnetic field.

Methods for Generating Neutrons

For each of the beams of nuclei and of electrons placed in an interference state, the width of the constructive and destructive interference regions may be less than or equal to $10^{-10}$ m, or for example $10^{-13}$ m, or for example $10^{-14}$ m, or for example $10^{-15}$ m.

The constructive interference regions of the beams of nuclei and of electrons, placed in an interference state, may overlap at least partially, for example substantially completely, in the collision step.

More particularly, at least 50%, for example at least 75%, for example substantially all of the volumes of the respective constructive interference regions of the beams of nuclei and of electrons, placed in an interference state, may overlap in the collision step.

Methods for Generating Nuclei

For each of the beams of nuclei and of neutrons placed in an interference state, the width of the constructive and destructive interference regions may be less than or equal to $10^{-10}$ m, or for example $10^{-13}$ m, or for example $10^{-14}$ m, or for example $10^{-15}$ m.

The constructive interference regions of the beams of nuclei and of neutrons, placed in an interference state, may overlap these partially, for example substantially completely, in the collision step.

More particularly, at least 50%, for example at least 75%, for example substantially all of the volumes of the respective constructive interference regions of the beams of nuclei and of neutrons, placed in an interference state, may overlap in the collision step.

The theory relating to the wave/corpuscle duality of the particles brought into play postulates that the particles forming the beam placed in a spatial interference state may have a greater probability of detection in the constructive interference regions than in the destructive interference regions.

The overlapping of the respective constructive interference regions of the beams, each first placed in an interference state, may result in an overlapping of the regions of maximum probability of detection of the particles and may therefore make it possible to increase the probabilities of collision of the particles forming the two beams.

Moreover, when seeking to generate particles by collision between at least two beams of neutrons, said beams of neutrons placed, before the collision, in an interference state may, for example, exhibit the characteristics described above for the beams of nuclei and of neutrons.

Method for Obtaining Beams of Nuclei and of Electrons Placed in an Interference State (Case of the Methods for Generating Neutrons)

The step for placing beams of nuclei and of electrons in an interference state may at least comprise:
  a step in which the beam of nuclei passes through a first interferometric device capable of placing said beam of nuclei in an interference state, and
  a step in which the beam of electrons passes through a second interferometric device capable of placing said beam of electrons in an interference state.

The first and second interferometric devices may be identical or different.

The beam of nuclei and/or of electrons may undergo, in the step of passing through its interferometric device, at least one, for example at least two, for example at least three successive diffractions.

The first and/or second interferometric device(s) may comprise a set of at least four, for example at least five, for example at least six diffraction gratings.

The diffraction gratings may be transmission-mode gratings.

The diffraction gratings may comprise silicon monocrystals.

Interferometric devices that can be used in the context of the present invention are, for example, described in "Neutron Interferometry", H. Rauch, ISBN: 78-3-540-70622-9.

The step of placing the beams of nuclei and of electrons in an interference state may also include a step in which at least one of said beams passes through at least one monochromator.

The step of passing through said at least one monochromator may take place before the step of passing through the interferometric device.

As a variant, in the step for placing the beams of nuclei and of electrons in an interference state, each of said beams may not pass through the monochromator. Thus, in the step for placing the beams of nuclei and of electrons in an interference state, it is possible for said beams to be polychromatic.

The step for placing the beams of nuclei and of electrons in an interference state may also include a step in which at least one, for example each, of said beams passes through at least one collimator.

The collimators of nuclei that can be used in the context of the present invention may for example comprise, for example consist of, copper or graphite.

An example of an electron collimator suitable for the invention is, for example, described in U.S. Pat. No. 3,942,019.

The step for passing through a collimator may take place after the step for passing through the interferometric device and may make it possible to obtain a single beam from a plurality of incident beams.

As a variant, in the step for placing the beams of nuclei and of electrons in an interference state, each of said beams may not pass through a collimator. It is, for example, possible to use interferometric devices with spherical symmetry in which the emergent beams may converge toward one and the same point.

The step for placing the beams of nuclei and of electrons in an interference state may include a step for maintaining the interference states of said beams.

This step for maintaining the interference states may, for example, comprise a step for optical containment of the beams of nuclei and of electrons, which may, for example, be implemented by using one or more laser(s).

Furthermore, the beams of neutrons may undergo a step for passing through at least one collimator. It is then, for example, possible to use as collimators stacks of polyethylene films or of monocrystalline Si films covered with $^{10}B$ or Gd.

Method for Obtaining Beams Placed in an Interference State (Case of the Methods for Generating Nuclei)

The step for placing the beams of nuclei and of neutrons in an interference state may at least comprise:
- a step in which the beam of nuclei passes through a first interferometric device capable of placing said beam of nuclei in an interference state, and
- a step in which the beam of neutrons passes through a second interfometric device capable of placing said beam of neutrons in an interference state.

The characteristics relating to the interferometric devices used to place the beams of nuclei and of electrons in an interference state may apply to the interferometric devices for placing the beams of nuclei and of neutrons intended to collide in an interference state in the context of the methods for generating nuclei according to the invention.

The step for placing the beams of nuclei and of neutrons in an interference state may also include a step in which at least one of said beams passes through at least one monochromator.

The step for passing through said at least one monochromator may take place before the step for passing through the interferometric device.

As a variant, in the step for placing the beams of nuclei and of neutrons in an interference state, each of said beams may not pass through a monochromator. Thus, in the step for placing the beams of nuclei and of neutrons in an interference state, it is possible for said beams to be polychromatic.

The step for placing the beams of nuclei and of neutrons in an interference state may also include a step in which at least one, for example each, of said beams passes through at least one collimator.

The collimators of nuclei that can be used in the context of the present invention may for example comprise, for example consist of, copper or graphite.

For the neutrons, it is, for example, possible to use as collimators stacks of polyethylene films or of monocrystalline Si films covered with $^{10}B$ or Gd.

The step for passing through a collimator may take place after the step for passing through the interferometric device and may make it possible to obtain a single beam from a plurality of incident beams.

As a variant, in the step for placing the beams of nuclei and of neutrons in an interference state, each of said beams may not pass through a collimator. It is, for example, possible to use interferometric devices with spherical symmetry in which the emergent beams may converge toward one and the same point.

In another exemplary embodiment, the methods according to the invention may include, before the collision step, a step for placing the first and second beams of nuclei in an interference state. These first and second beams of nuclei placed in an interference state may, for example, exhibit the characteristics described above for the beams of nuclei and of neutrons placed in an interference state.

It is also understood that these first and second beams of nuclei may undergo the steps, described above for the beams of nuclei, for passing through interferometric device(s) and possibly passing through monochromator(s) and collimator(s).

When seeking to generate particles by collision between at least two beams of neutrons, said beams may for example undergo the steps, described above, for passing through interferometric device(s) and possibly passing through monochromator(s).

The interference states obtained may be maintained, for example, by optical containment by using one or more laser(s).

Magnetic Fields

Magnetic Fields Used for Placing the Beams in a Defined Spin State

In the context of the methods for generating neutrons according to the invention, the step for placing the beams of nuclei and of electrons in a defined spin state may comprise at least one step of applying at least:
- a first magnetic field, configured to place the spins of the nuclei in a defined state, having a static component in time of intensity between 0.5 and 45 T and/or a non-zero gradient on the axis of the collision, and
- a second magnetic field, configured to place the spins of the electrons in a defined state, having a static component in time of intensity between 0.1 and 20 T and/or a non-zero gradient on the axis of the collision.

In the context of the methods for generating nuclei according to the invention, the step for placing the beams of nuclei and of neutrons or the beams of atomic particles and of neutrons in a defined spin state may include at least one step of applying at least:

- a first magnetic field, configured to place the spins of the nuclei or of the atomic particles in a defined state, having a static component of intensity between 0.5 and 45 T and/or a non-zero gradient on the axis of the collision, and
- a second magnetic field, configured to place the spins of the neutrons in a defined state, having a static component of intensity between 0.5 and 45 T and/or a non-zero gradient on the axis of the collision.

The first and second magnetic fields may be identical or distinct.

The first and second magnetic fields may be generated by the same source or by distinct sources.

At least one, for example each, of the first and second magnetic fields may be static.

As a variant, at least one, for example each, of the first and second magnetic fields may include a static component and a non-zero variable component.

Hereinbelow, for a given magnetic field $\vec{B}(x, y, z, t)$, its static component $\vec{B}_{stat}(x, y, z)$ and its variable component $\underline{\vec{B}}(x, y, z, t)$ are defined as satisfying: $\vec{B}(x, y, z, t) = \vec{B}_{stat}(x, y, z) + \underline{\vec{B}}(x, y, z, t)$ in which $\vec{B}_{stat}(x, y, z)$ is a quantity independent of time and $\underline{\vec{B}}(x, y, z, t)$ is a quantity that does not include any term that is invariant as a function of time. In other words, the frequency spectrum of $\underline{\vec{B}}(x, y, z, t)$ does not include any peak centered on the zero frequency.

Static Components

The characteristics concerning the static components described below are also valid for the static magnetic fields that have a zero variable component.

In the context of the methods for generating neutrons according to the invention, the static component of the first, respectively second, magnetic field may make it possible to place the beam of nuclei, respectively of electrons, in a defined spin state.

In the context of the methods for generating nuclei according to the invention, the static component of the first, respectively second, magnetic field may make it possible to place the beam of nuclei, respectively of neutrons, in a defined spin state.

The static component of the first magnetic field may for example have an intensity of between 1 T and 20 T.

The static component of the second magnetic field may for example have an intensity of between 1 T and 20 T.

Static components suitable for the invention may be generated by superconductive coils, resistive coils or "hybrid" coils comprising a resistive coil and a superconductive coil.

The first and second magnetic fields may have different variable components.

The variable components of the first and/or second magnetic fields may for example be applied in the form of at least one beam of photons.

The application of a variable component may make it possible, for the particles brought into play, to increase the proportion of spins oriented in the direction of the static component in order to increase the probability of generation of neutrons or of nuclei in the collision.

In effect, the quantum physics theory postulates that the application of at least one variable component having, for example, a frequency spectrum including at least one peak centered on a frequency equal to the resonance frequency of the spins may, for example, make it possible to induce transitions between different energy levels. This resonance frequency corresponds to the precession frequency of the spins around the static component, called Larmor precession frequency. It then becomes possible for the spins, for example oriented, before application of the variable component, in the reverse direction of the direction of application of the static component, to absorb at least a portion of the energy of the variable component applied and to pass to an oriented state in which said spins are aligned in the same direction as the static component.

It is possible, for example, to apply the variable component at the same time as the static component.

The measurement of the quantity of neutrons produced, of protons deflected or of the electrical potential created by the protons not having undergone a collision may, for example, make it possible for an operator to have indicators on the need to apply the variable component of the first and/or second magnetic fields.

The field lines of the variable component may be, in the beams of particles, non-colinear to the field lines of the static component. They may, for example, form with them an angle greater than 10°, for example greater than 45°. In particular, the field lines of the variable component may form an angle of between 85 and 95° with the field lines of the static component.

The variable component of the first magnetic field may be applied continuously.

As a variant, the variable component of the first magnetic field may be applied in the form of pulses of which those skilled in the art will be able to determine the duration. As an indication, the duration of the pulses may, for example, be between 0.1 and 100 µs, for example between 1 and 50 µs.

The variable component of the second magnetic field may be applied continuously.

As a variant, the variable component of the second magnetic field may be applied in the form of pulses of which those skilled in the art will be able to determine the duration. As an indication, the duration of the pulses may, for example, be between 0.1 and 100 µs.

The variable component of the first magnetic field may exhibit a frequency spectrum including at least one peak centered on a frequency, for example, of between 20 and 600 MHz, for example between 50 and 500 MHz, for example between 100 and 200 MHz.

In the context of the methods for generating neutrons according to the invention, the variable component of the second magnetic field may exhibit a frequency spectrum including at least one peak centered on a frequency, for example, of between 10 and 200 GHz.

In the context of the methods for generating nuclei according to the invention, the variable component of the second magnetic field may exhibit a frequency spectrum including at least one peak centered on a frequency, for example, of between 20 and 600 MHz, for example of between 50 and 500 MHz, for example of between 100 and 200 MHz.

The variable components of the first and second magnetic fields may be generated by resonant circuits, for example of RLC type, comprising at least one resonance coil.

Gradients on the Axis of the Collision

As mentioned above, the first and/or second magnetic field(s) may have a non-zero gradient on the axis of the collision.

The quantum physics theory postulates that the application of a magnetic field having a non-zero gradient may make it possible to place the spins in a defined state and align them colinearly with the field.

The direction of the gradient may form a non-zero angle, for example greater than 45°, for example substantially equal to 90°, with the axis of the collision.

When the direction of the gradient forms a non-zero angle with the axis of the collision, it is, for example, possible to separate the particles according to their spin state. It is then possible to obtain, from one and the same beam of particles, a plurality of beams each having within them particles placed in a defined spin state.

As a variant, the direction of the gradient may form a substantially zero angle with the axis of the collision. In the latter case, it is possible for the first and/or second magnetic field(s) to each, also, include a static component and a non-zero variable component. Said static and variable components may be as described above.

Moreover, the first and/or second magnetic field(s) may exhibit, on the axis of the collision, a gradient of non-zero intensity and, for example, less than 20 T/m. The first and/or second magnetic field(s), having a non-zero gradient on the axis of the collision, may be applied continuously.

As a variant, the first and/or second magnetic field(s), having a non-zero gradient on the axis of the collision, may be applied in the form of pulses.

Magnetic field gradients suitable for the invention may, for example, be produced by two air gaps similar to those implemented in the experiment by Stern and Gerlach or by a plurality of windings having different numbers of loops and/or different diameters.

Magnetic and Electrical Fields Used to Deflect the Particles

Deflection of the Electrons

The methods for generating neutrons according to the invention may include, before the collision step, a step for deflecting the beam of electrons.

The deflection of the beam of electrons may make it possible to not necessarily position the sources of electrons and of nuclei facing each other, thus reducing the damage to the source of electrons by the neutrons generated after collision between the beams of nuclei and of electrons.

The step for deflection of the beam of electrons may include a step for application of at least one deflection magnetic field and/or at least one deflection electrical field.

The deflection magnetic field may be static or not.

The deflection electrical field may be static or not.

The deflection magnetic field may, for example, have an intensity of between 0.1 and 5 T, for example between 0.5 and 3 T.

The deflection magnetic field may be uniform or nonuniform.

The deflection electrical field may be uniform or nonuniform.

Deflection of the Nuclei and of the Atomic Particles

The methods for generating neutrons according to the invention may include a step for deflection of the nuclei not having undergone a collision with the electrons.

The methods for generating nuclei according to the invention may include a step for deflection of the nuclei or of the atomic particles not having undergone a collision with the neutrons.

This step for deflection of the nuclei or of the atomic particles may include a step for application of at least one deflection magnetic field and/or at least one deflection electrical field.

For example, when the sources of nuclei or of atomic particles and of neutrons are positioned facing each other, the source of neutrons may be damaged by the nuclei or the atomic particles not having undergone a collision. Thus, the deflection of these nuclei or of these atomic particles, for example via a magnetic and/or electrical field, may make it possible to limit, for example eliminate, this damage.

The deflection of the nuclei not having undergone a collision may even make it possible to limit the presence of the latter in the beam of neutrons produced in the case of the methods for generating neutrons according to the invention.

The deflection magnetic field may be static or not.

The deflection electrical field may be static or not.

The deflection magnetic field may, for example, have an intensity of between 0.1 and 5 T, for example between 0.5 and 3 T.

The deflection magnetic field may be uniform or nonuniform.

The deflection electrical field may be uniform or nonuniform.

Moreover, when seeking to cause a first beam of nuclei and a second beam of nuclei placed in an interference state to collide, the deflection magnetic and/or electrical field may make it possible to deflect the nuclei not having undergone a collision.

Magnetic Fields Used to Maintain the Spin State of the Neutrons Generated after Collision Between the Beams of Nuclei and of Electrons The methods for generating neutrons according to the invention may include, after the collision step, a step for maintaining the spin state of the neutrons generated.

This maintaining step may include a step for application of at least one maintaining magnetic field.

The maintaining magnetic field may be static.

The maintaining magnetic field may be uniform.

The maintaining magnetic field may have an intensity of between 0.5 and 45 T, for example between 1 and 20 T.

The maintaining magnetic field may be obtained by superconductive coils, resistive coils or "hybrid" coils.

Chamber

Vacuum and Temperature

The methods according to the invention may take place in a chamber that has a pressure less or equal to for example 1 Pa, for example $10^{-5}$ Pa.

A chamber having a low pressure makes it possible to limit the density of particles and may therefore make it possible to limit the potential disturbance sources of the beams.

Such pressures may, for example, be obtained by the use of ionic vacuum pumps or by any other means considered by those skilled in the art as suitable for the invention.

The method according to the invention may take place in a chamber that includes substantially no substance other than the beams intended to collide.

Wall of the Chamber

The thickness and the nature of the material forming the wall of the chamber can be chosen so as to contain the radiations and particles produced after the collision step as well as the beams intended to collide.

Output Diaphragm

The particle collider for generating neutrons according to the invention may include an output diaphragm.

For example, in the case where the particle collider according to the invention is linked to another vacuum chamber, the output diaphragm may be an openwork disk so as to allow the beam of neutrons to pass.

The output diaphragm may include, for example consist of, one or more materials that are weak neutron absorbers.

The output diaphragm may include, for example consist of, carbon, magnesium, lead, silica, zirconium or aluminum.

The aperture of the output diaphragm may be of any form, for example circular, oval, elliptical, polygonal.

Production and Recovery of Energy

The collision step, notably in the context of the methods for generating nuclei according to the invention, may generate a release of energy, for example in the form of heat.

The heat produced, in the collision step, may, for example, be recovered by a heat exchanger in which one or more heat-transfer fluid(s) circulate(s).

For the heat-transfer fluid, any fluid known to those skilled in the art as suitable for the invention may be used.

It is also possible to use any type of material that becomes fluid at high temperatures such as sodium for example.

DESCRIPTION OF THE FIGURES

The invention may be better understood from reading the following detailed description of non-limiting exemplary implementations thereof, and on studying the appended drawing, in which.

Hereinbelow, the vectors are represented in bold characters.

Figure 1:
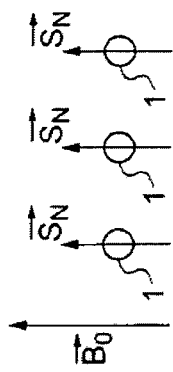
FIG. 1 schematically illustrates a plurality of spins subject to the action of a magnetic field capable of placing them in a defined spin state, FIG. 2 schematically represents an exemplary installation for generating neutrons according to the invention, FIGS. 2a and 2b schematically represent, at two different times, an installation corresponding to a variant embodiment of FIG. 2, FIG. 3 schematically illustrates a detail of FIG. 2, FIGS. 3a to 3c schematically illustrate variants of FIG. 3, FIG. 4 schematically represents another exemplary embodiment of an installation for generating neutrons according to the invention, FIG. 5 schematically illustrates the collision of the beams of electrons and of nuclei implemented in FIG. 4, FIG. 6 schematically represents an exemplary embodiment of an interferometric device for obtaining a beam placed in an interference state, and FIG. 7 schematically represents an exemplary embodiment of a medical installation according to the invention, FIG. 8 schematically represents an exemplary installation for generating nuclei according to the invention, FIG. 9 schematically represents a detail of FIG. 8, FIG. 9a schematically represents a variant of FIG. 9, FIG. 10 schematically represents another exemplary embodiment of an installation for generating nuclei according to the invention, FIG. 11 schematically illustrates the collision of the beams of nuclei and of neutrons implemented in FIG. 10, and FIG. 12 schematically represents an exemplary embodiment of a medical installation according to the invention.

FIG. 1 schematically illustrates a plurality of nuclei 1, for example intended to collide with a plurality of electrons, each having a spin $S_N$ subject to the action of a magnetic field $B_0$ capable of placing them in a defined spin state. The field $B_0$ comprises a static component and a variable component and/or a non-zero gradient on the axis of the collision. The spins of the nuclei 1 are, under the action of the field $B_0$, aligned with $B_0$. Furthermore, the spins may, as represented, be in the same direction as $B_0$.

Obviously, although not illustrated, the spins of a plurality of electrons subject to the action of a magnetic field capable of placing them in a defined spin state will also be aligned with said magnetic field. These spins may also be in the same direction as said magnetic field.

Obviously, although not illustrated, the spins of a plurality of neutrons subject to the action of a magnetic field capable of placing them in a defined spin state will also be aligned with said magnetic field. Furthermore, these spins may be in the same direction as said magnetic field.

Figure 2:
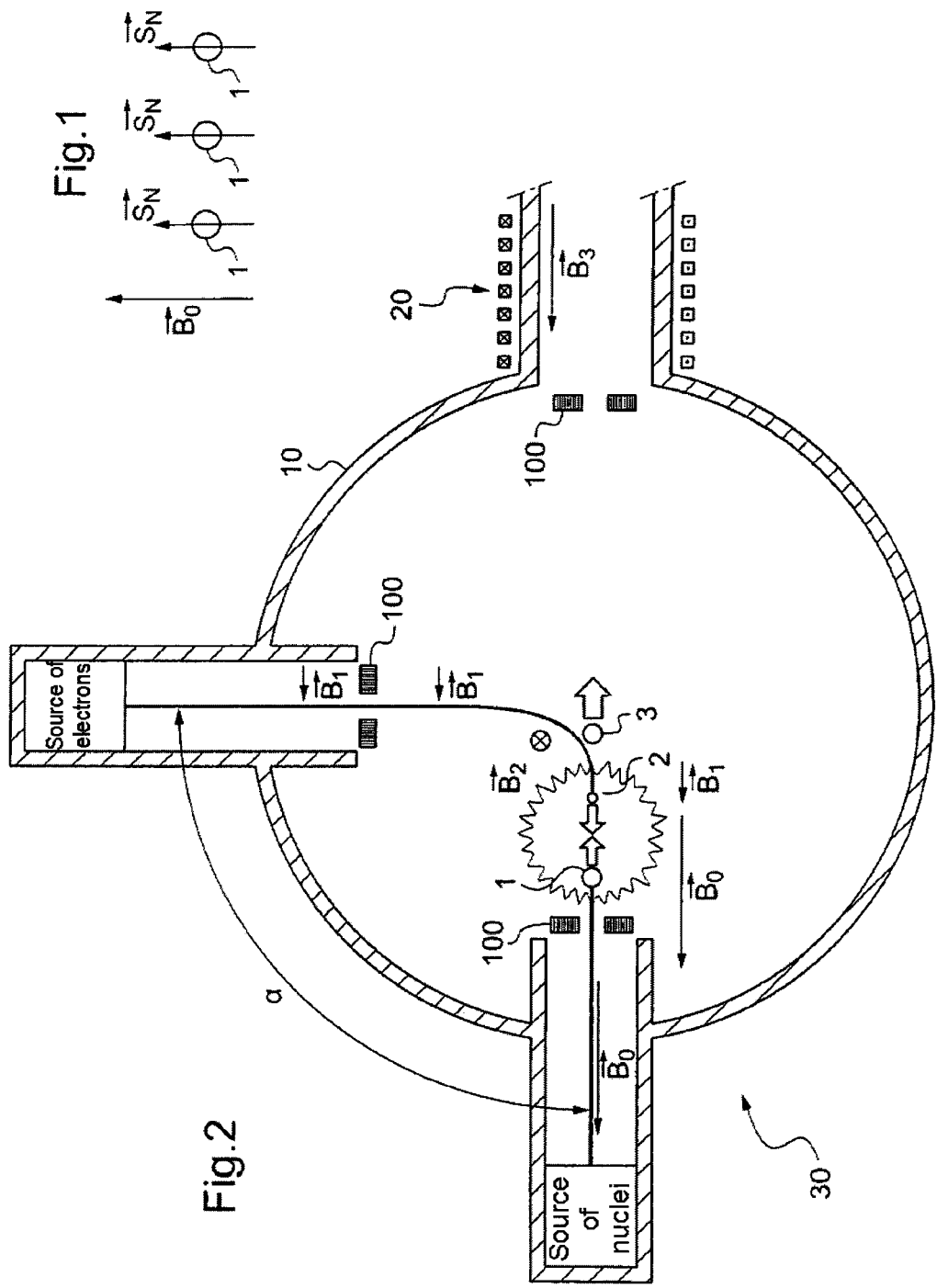

FIG. 2 represents a beam of electrons 2 generated by a source of electrons and a beam of nuclei 1 generated by a source of nuclei.

The beams of electrons and of nuclei generated are each made to pass through a diaphragm 100 arranged after the output of their respective source.

A first magnetic field $B_0$, configured to place the beam of nuclei 1 in a defined spin state, said beam comprising a static component and a variable component and/or a non-zero gradient on the axis of the collision, is applied.

The beam of electrons 2 is subject to a second magnetic field $B_1$, configured to place the beam of electrons 2 in a defined spin state, said beam of electrons comprising a static component and a variable component and a non-zero gradient on the axis of the collision.

The beam of electrons 2 is then deflected by a deflection magnetic field $B_2$. Although not illustrated, the beam of electrons could be deflected by a deflection electrical field or even by the combination of a deflection electrical field and a deflection magnetic field.

It is found that the beams of nuclei 1 and of electrons 2 form, at the output of their respective source, an angle α which is represented, in FIG. 2, as being substantially equal to 90°. More generally, the angle α may be between 0 and 180°. When a is greater than or equal to 90°, it may be preferable to apply a deflection magnetic and/or electrical field so as to bring, in the collision step, the beams of nuclei 1 and of electrons 2 into a substantially opposite direction of displacement. On the other hand, when a is less than 90°, it may be preferable to apply a deflection magnetic and/or electrical field so as to bring, in the collision step, the beam of nuclei 1 and of electrons 2 into a substantially identical direction of displacement.

The first and second magnetic fields are generated by coils that are not represented.

The collision between the beam of nuclei 1 and the beam of electrons 2 takes place in a chamber 30 comprising a wall 10 and causes neutrons 3 to be generated. It can be seen that, in the collision step, the beam of nuclei 1 and of electrons 2 have a substantially opposite direction of displacement.

The neutrons generated 3 may be made to pass through a diaphragm 100.

The neutrons generated 3 may be maintained in a defined spin state by the maintaining magnetic field $B_3$, for example created by a coil 20.

FIG. 3 illustrates the spin states of nuclei 1 and of electrons 2 just before their collision. As illustrated, the spins of the electrons $S_e$ and the spins of the nuclei $S_N$ may, in the collision step, be aligned in the same direction. Furthermore, the spins of the nuclei 1, respectively of the electrons 2, may be colinear to the velocity vectors of the nuclei 1, respectively of the electrons 2, in the collision step.

FIG. 3a represents a variant embodiment of FIG. 3 in which the second magnetic field is identical to the first magnetic field $B_0$ and is a static field. It can be seen that the spins are placed in a defined state but are not all aligned in the direction of the field.

FIG. 3b represents a variant embodiment of FIG. 3 in which the beams of nuclei 1 and of electrons 2 have, in the collision step, substantially identical directions of displacement. In this case, the angle α between the beams of nuclei 1 and of electrons 2 at the output of their respective source may, for example, be less than 90°. The spin of the nucleus 1, respectively of the electron 2, and the velocity vector of the nucleus 1, respectively of the electron 2, may be colinear and have the same direction in the collison step.

FIG. 3c represents a variant embodiment in which a nucleus 1 not having undergone a collision is deflected by the deflection magnetic field $B_2$.

In FIGS. 3b and 3c, although not illustrated, the deflection magnetic field $B_2$ may be replaced by a deflection electrical field or by the combination of a deflection magnetic field and a deflection electrical field.

The sources of nuclei and of electrons are represented, in FIG. 2a, as facing each other, each respectively generating a beam of nuclei 1 and a beam of electrons 2, each having substantially the same direction and an opposite direction of displacement.

Furthermore, a first magnetic field $B_0$ identical to the second magnetic field, making it possible to place the beams of nuclei 1 and of electrons 2 in a defined spin state, is applied in the chamber 30.

FIG. 2b represents the development of the system of FIG. 2a after the collision step, in which a beam of neutrons 3 is generated substantially in the direction of the source of electrons.

Obviously, the source of electrons 2 is, as illustrated, chosen so as to limit the interactions and therefore the damage produced by the beam of neutrons 3.

In FIG. 4, the beams of nuclei 1 and of electrons 2 are, before the collision, placed in an interference state. The beam of electrons 2 is also deflected under the action of a deflection magnetic field $B_2$. A beam of neutrons 3 is generated after collision between the beam of electrons and the beam of nuclei.

FIG. 5 schematically illustrates the collision of the beams of nuclei 1 and of electrons 2, each placed in a spatial interference state. The constructive interference regions 40 in the beam of nuclei 1 are illustrated as overlapping substantially all of the constructive interference regions 50 present in the beam of electrons 2 placed in a spatial interference state. FIG. 5 further illustrates the overlapping of the respective destructive interference regions of the two beams 41 and 51.

Figure 6:
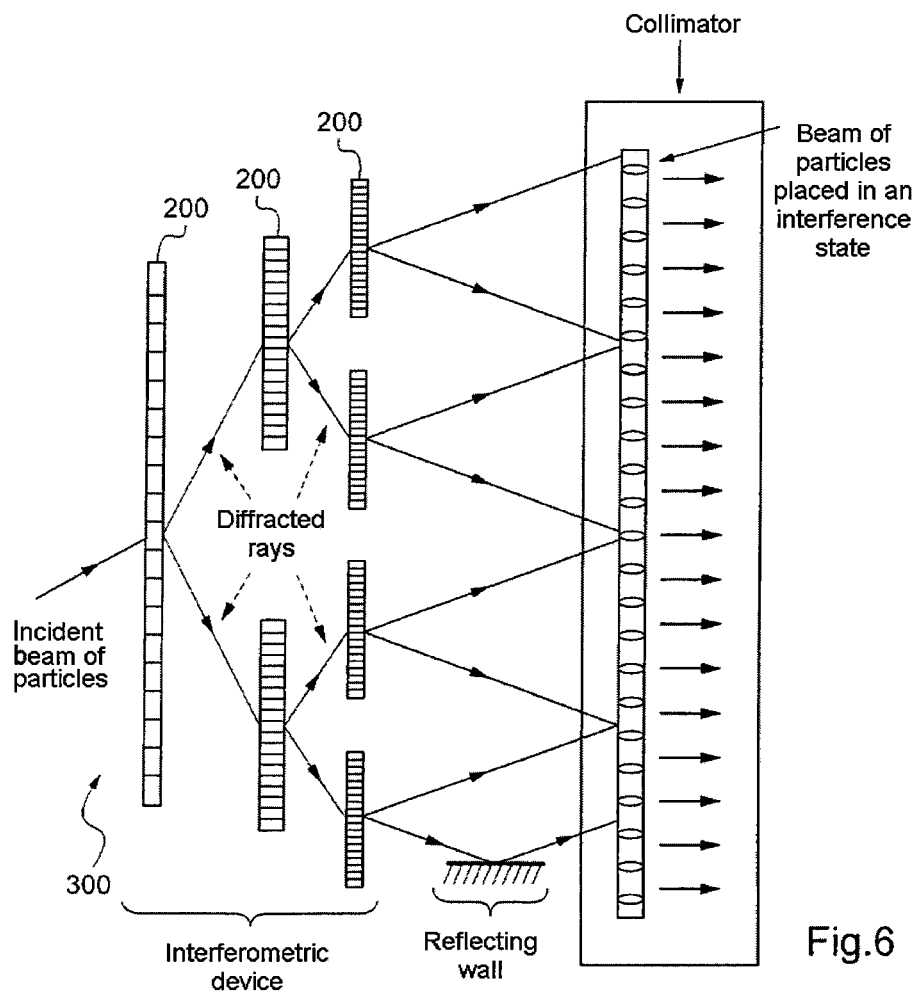

FIG. 6 represents an interferometric device 300 making it possible to place a beam of incident particles in an interference state comprising a succession of transmission-mode diffraction gratings 200.

The beams of particles emerging from the diffraction gratings 200 then pass through a collimator making it possible to generate only a single beam.

Figure 7:
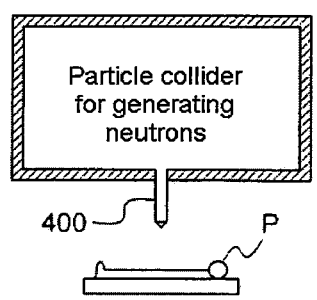

The medical installation represented in FIG. 7 is used for the destruction of cancerous cells by neutron beam. This installation comprises a means for positioning a patient to be treated P and the particle collider according to the invention at the output of which is placed an irradiation head 400 making it possible to irradiate the patient P with the beam of neutrons generated by the particle colliders according to the invention.

Figure 8:
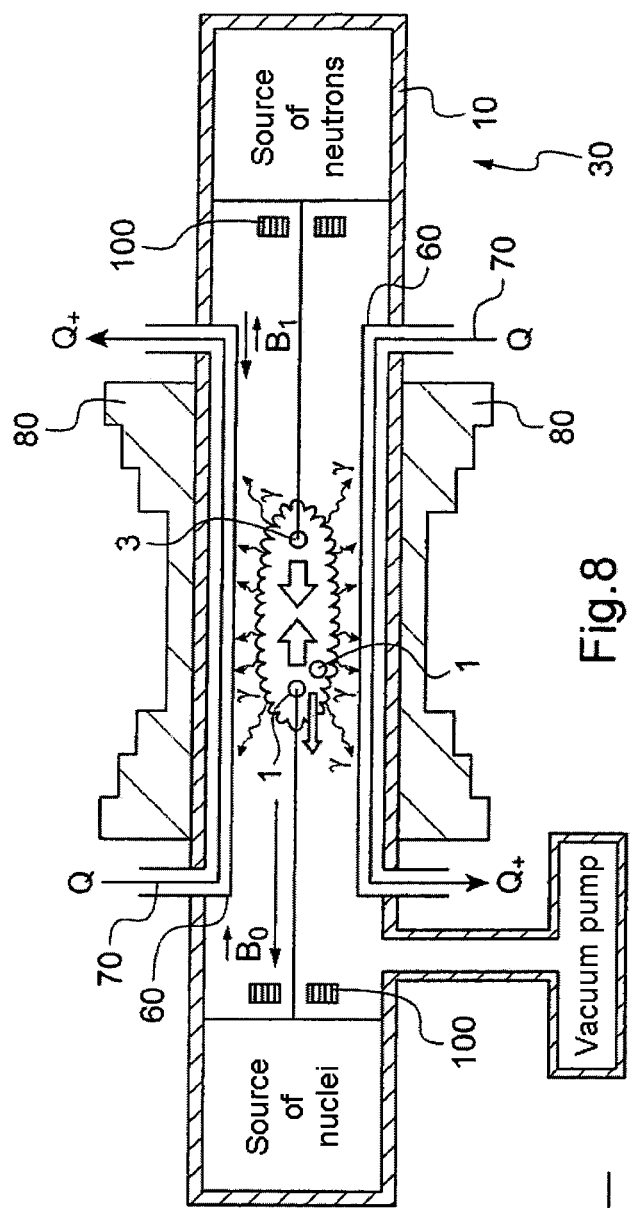

FIG. 8 represents a beam of nuclei 1 generated by a source of nuclei and a beam of neutrons 3 generated by a source de neutrons. What is described below concerning the nuclei 1, placed in a defined spin state, may be applicable to the atomic particles.

The beams of neutrons 3 and of nuclei 1 generated are each made to pass through a diaphragm 100 arranged after the output of their respective source.

A first magnetic field $B_0$ comprising a static component and a variable component and/or a non-zero gradient on the axis of the collision, configured to place the beam of nuclei 1 in a defined spin state, is applied.

The beam of neutrons 3 undergoes a second magnetic field $B_1$, configured to place the beam of neutrons 3 in a defined spin state, said beam comprising a static component and a variable component and/or a non-zero gradient on the axis of the collision.

The first and second magnetic fields are generated by one or more coils 80.

The collision between the beam of nuclei 1 and the beam of neutrons 3 takes place in a chamber 30 comprising a wall 10 and results in the generation of nuclei 1 and a release of heat.

The heat produced in the collision is recovered by a heat exchanger 60 in which a heat-transfer fluid 70 circulates.

The particles not having undergone a collision and/or produced in the collision are evacuated by the vacuum pump.

Figure 9:
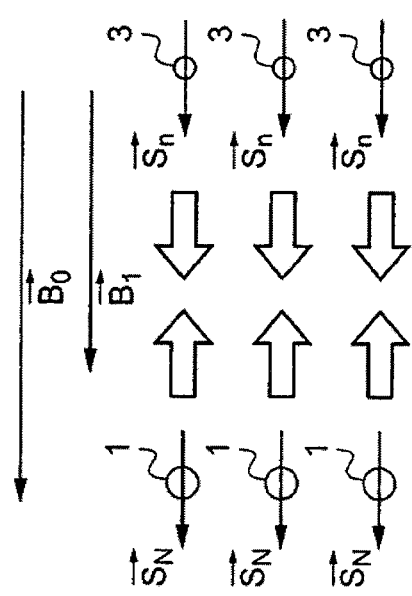

FIG. 9 illustrates the spin states of nuclei 1 and of neutrons 3 just before their collision. As illustrated, the spins of the neutrons $S_n$ and the spins of the nuclei $S_N$ may, in the collision step, be aligned in the same direction. Furthermore, the spins of the nuclei 1, respectively of the neutrons 3, may be colinear to the velocity vectors of the nuclei 1, respectively of the neutrons 3, in the collision step.

FIG. 9a represents a variant embodiment of FIG. 9 in which the second magnetic field is identical to the first magnetic field $B_0$ and is a static field. It can be seen that the spins are placed in a defined state but are not all aligned in the direction of the field.

In FIG. 10, the beams of nuclei 1 and of neutrons 3 are, before the collision, placed in an interference state. What is described below for the beams of neutrons 3, placed in an interference state, may be applicable to a second beam of nuclei 1.

FIG. 11 schematically illustrates the collision of the beams of nuclei 1 and of neutrons 3 each placed in an interference state. The constructive interference regions 40 in the beam of nuclei 1 are illustrated as substantially overlapping all of the constructive interference regions 500 present in the beam of neutrons 3 placed in an interference state. FIG. 11 also illustrates the overlapping of the respective destructive interference regions of the two beams 41 and 510.

The medical installation represented in FIG. 12 is used for the destruction of cancerous cells by beam of nuclei. This installation comprises a means for positioning a patient to be treated P and a particle collider according to the invention, at the output of which is placed an irradiation head 400 making it possible to irradiate the patient P with the beam of nuclei generated by the particle colliders according to the invention.

The expression "comprising a(n)" should be understood to mean "comprising at least one".

The invention claimed is:

1. A method for generating neutrons comprising the successive steps:
   a) placing at least one beam of electrons and at least one beam of nuclei chosen from protons, deuterons and tritons in a defined spin state, and
   b) causing said at least one beam of nuclei and at least one beam of electrons to collide along a collision direction,
   wherein, in the step b), the spins of the electrons and of the nuclei are aligned in a same direction as the collision direction by application of a first magnetic field applied to the nuclei and a second magnetic field applied to the electrons, and
   wherein, in the step b), the spins of the electrons, respectively of the nuclei, and velocity vectors of the electrons, respectively of the nuclei, are collinear, and
   wherein at least 50% of the nuclei forming the beam of nuclei have an energy between 1 and $10^7$ eV and/or at least 50% of the electrons forming the beam of electrons have an energy between 1 and $10^7$ eV.

2. The method as claimed in claim 1, wherein the beams of nuclei and of electrons each being placed in a spatial interference state in the step a).

3. The method as claimed in claim 1, wherein the velocity vectors of the electrons and of the nuclei, caused to collide, forming, in the step b), an oriented angle of between 170° and 190° or the velocity vectors of the electrons and of the nuclei, caused to collide, forming, in the step b), an oriented angle of between −10° and 10°.

4. The method as claimed in claim 1, wherein the step a) comprising a step of applying at least:
   the first magnetic field, configured to place the spins of the nuclei in a defined state, having a static component of intensity between 0.5 and 45 T and/or a non-zero gradient on the axis of the collision, and
   the second magnetic field, configured to place the spins of the electrons in a defined state, having a static component of intensity between 0.1 and 20 T and/or a non-zero gradient on the axis of the collision.

5. The method as claimed in claim 4, wherein the first magnetic field also having a variable component applied in the form of pulses and the second magnetic field also having a variable component applied in the form of pulses.

6. The method as claimed in claim 4, wherein the first magnetic field also having a variable component exhibiting a frequency spectrum including a peak centered on a frequency of between 20 and 600 MHz and the second magnetic field also having a variable component exhibiting a frequency spectrum including a peak centered on a frequency of between 10 and 200 GHz.

7. The method as claimed in claim 1, wherein an emission of pulses being selected from the group consisting of said at least one beam of nuclei being emitted in the form of pulses of a duration less than or equal to $10^{-3}$ s and said at least one beam of electrons being emitted in the form of pulses of a duration less than or equal to $10^{-3}$ s.

8. The method as claimed in claim 1, also comprising a step of maintaining the spin state of the generated neutrons after the step b).

9. The method as claimed in claim 1, wherein at least 50% of particles forming said beams have said defined spin state aligned in the collision direction.

10. The method as claimed in claim 1, wherein the spin and the velocity vector of particles forming said beams are either in the same direction or in opposite directions so that the spins of the electrons and the velocity vectors of the electrons are collinear.

* * * * *

UNITED STATES PATENT AND TRADEMARK OFFICE
CERTIFICATE OF CORRECTION

PATENT NO. : 10,764,987 B2  
APPLICATION NO. : 13/512065  
DATED : September 1, 2020  
INVENTOR(S) : Arash Mofakhami and Tarek Nassar Page 1 of 1

It is certified that error appears in the above-identified patent and that said Letters Patent is hereby corrected as shown below:

In the Specification

Column 7, Line 40, "example 1 for example 1 ns," should be -- example 1 µs, for example 1 ns, --

Column 8, Line 52, "be between 1 and $10^{-1}$m," should be -- be between $10^{-8}$ and $10^{-1}$m, --

Signed and Sealed this  
Fourth Day of May, 2021

Drew Hirshfeld  
*Performing the Functions and Duties of the*  
*Under Secretary of Commerce for Intellectual Property and*  
*Director of the United States Patent and Trademark Office*